Sept. 14, 1965 H. F. STIFFLER 3,205,651
SWITCH ACTUATING TIME CLOCK WITH
INTERMITTENT CLUTCH DRIVE
Filed Jan. 3, 1963 11 Sheets-Sheet 1

INVENTOR.
HAROLD F. STIFFLER
BY John A. Harvey
ATTORNEY

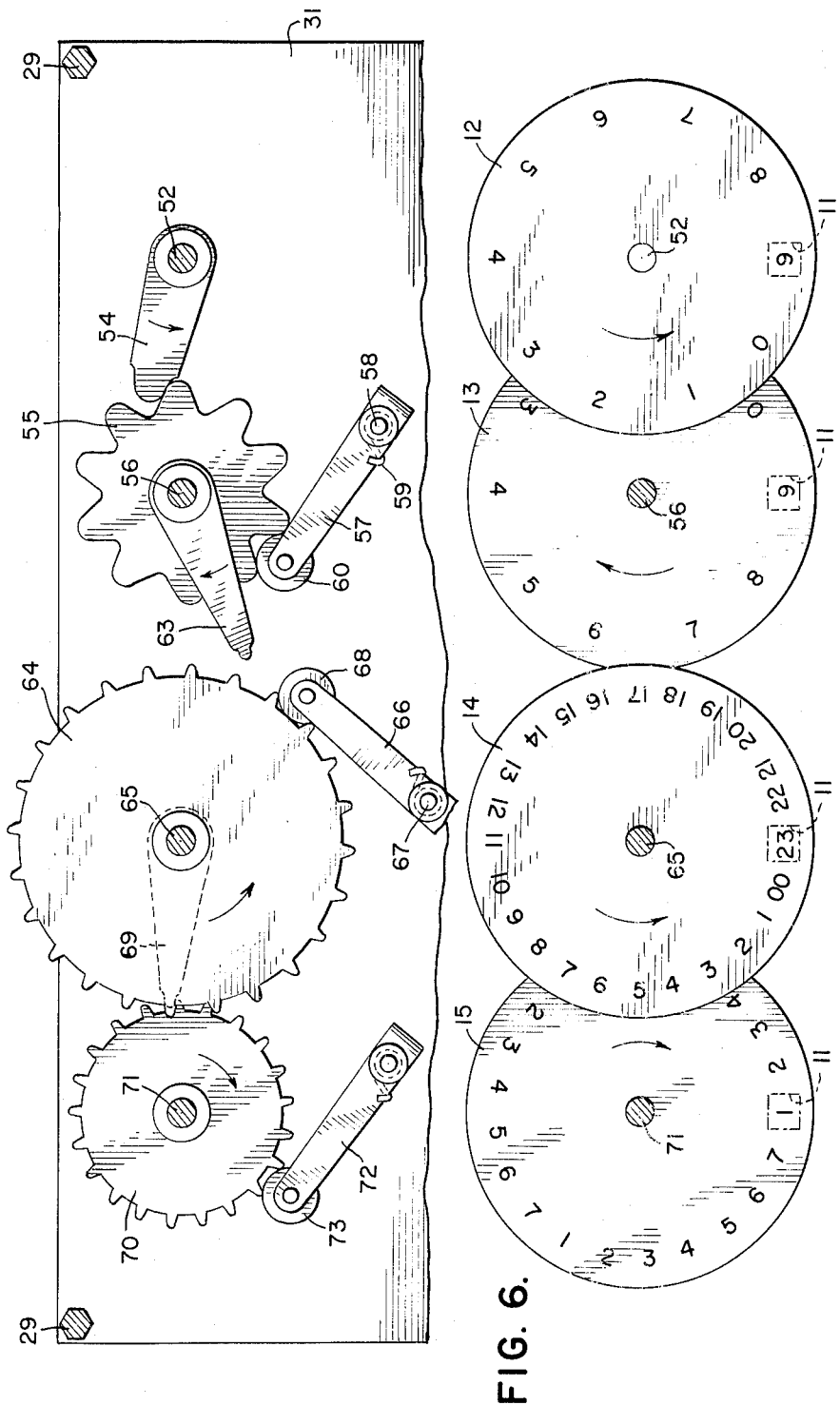

| TABLE A | |
|---|---|
| NUMBER | CODE |
| 0 | 6 |
| 1 | — |
| 2 | 2 |
| 3 | 1,2,5 |
| 4 | 3 |
| 5 | 1,3,5 |
| 6 | 2,3,5 |
| 7 | 1,2,3 |
| 8 | 4 |
| 9 | 1,4,5 |

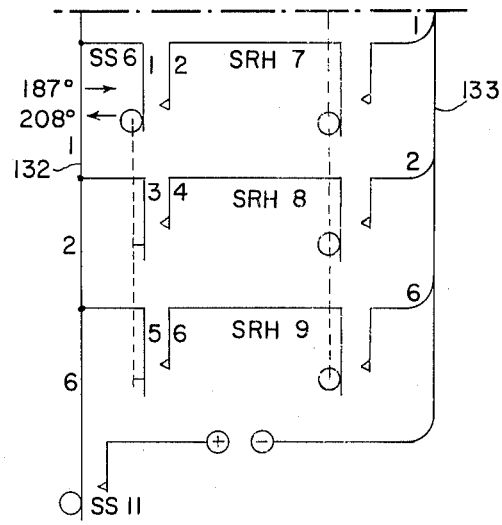
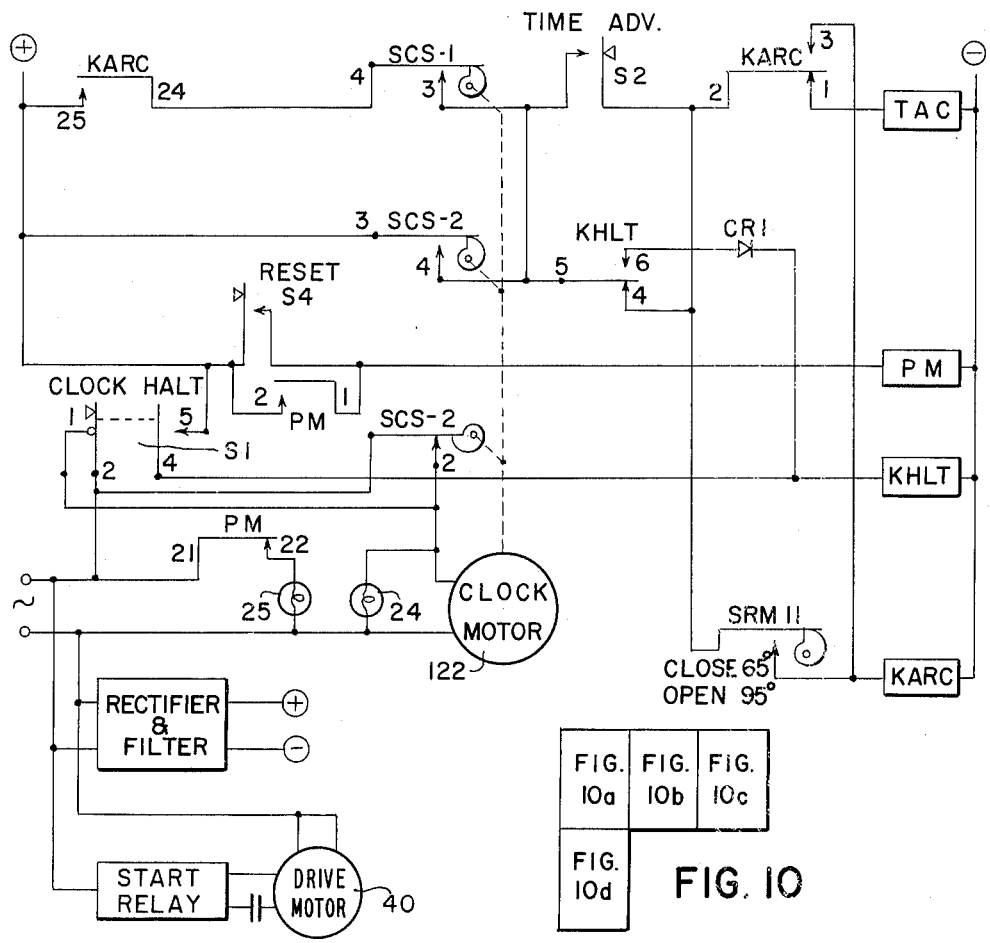
FIG. 10d
| SS 11 | |
|---|---|
| CLOSE | OPEN |
| 50° | 63° |
| 85° | 98° |
| 121° | 133° |
| 156° | 169° |
| 191° | 204° |
| 226° | 239° |
| 261° | 274° |
| 297° | 310° |
| FIG. 10a | FIG. 10b | FIG. 10c |
|---|---|---|
| FIG. 10d | | |
FIG. 10

3,205,651
SWITCH ACTUATING TIME CLOCK WITH
INTERMITTENT CLUTCH DRIVE
Harold F. Stiffler, Scottsville, N.Y., assignor, by mesne assignments, to Friden, Inc., San Leandro, Calif., a corporation of Delaware
Filed Jan. 3, 1963, Ser. No. 249,261
10 Claims. (Cl. 58—24)

The present invention relates to time clocks and, particularly, to time clocks electrically energized and synchronously operating to provide time signals for record purposes.

Electrically energized time clocks heretofore proposed conventionally include a synchronous electrical motor mechanically coupled through a gear reduction train to a seconds or minutes shaft, and the latter shaft in turn is mechanically coupled through a further gear reduction train to an hour shaft. An additional gear reduction train mechanically couples the hour shaft to a day shaft if provided. When the prevailing time of the clock is to be recorded or perhaps transmitted to a remote point of recording, the clock conventionally generates electrical timing pulses at each minute, hour and day interval and these pulses then control minute, hour and day counter devices provided locally or at a remote point. Appropriate dials on these counters visually indicate the prevailing time, and the counter wheels may be provided with print wheels to make printed time recordings as desired. These counters are usually electromagnetically controlled stepping counters operating to make continuing cumulative counts of the electrical timing pulses. An equivalent form of electrical pulse cumulative counter sometimes employed is comprised by a closed multistage ring of electronic multivibrators. The latter type of counter has the advantage, where electrical recordings of time signals are desired, that each time-digit count may readily be arranged to generate a coded form of digit suitable for recording. Regardless of the form of count used, however, the prior forms of time clock do not themselves directly generate and transmit coded signals indicative of prevailing time. Rather, they generate only time-interval control signals which themselves are not indicative of prevailing time but simply enable counter devices to indicate the prevailing time and effect printed or electrical time recordings.

It is an object of the present invention to provide a new and improved time clock suitable for use as a master clock in numerous and diverse system applications requiring a reliable time standard for record purposes.

It is a further object of the invention to provide an improved record time clock of relatively simple yet sturdy construction characterized by unusually high operational reliability over prolonged periods of operation without the need for significant maintenance care or attention.

It is an additional object of the invention to provide a novel time clock which continuously supplies in simple yet highly reliable manner, and for each time digit of interest, coded multi-digit time-indication control actuations capable of translating substantial electrical power to effect time recordings either locally or after transmission to a remote point.

Other objects and advantages of the invention will appear as the detailed description thereof proceeds in the light of the drawings forming a part of this application and in which:

FIGS. 5 and 6 are partial elevational views illustrating the arrangement of certain gearing and time indicator dials embodied in the time clock;

FIG. 7 is a rear cross-sectional view taken along the plane 7—7 of FIG. 2 and illustrating more clearly certain cams and associated cam-actuated contact sub-assemblies incorporated in the time clock;

Figure 9:
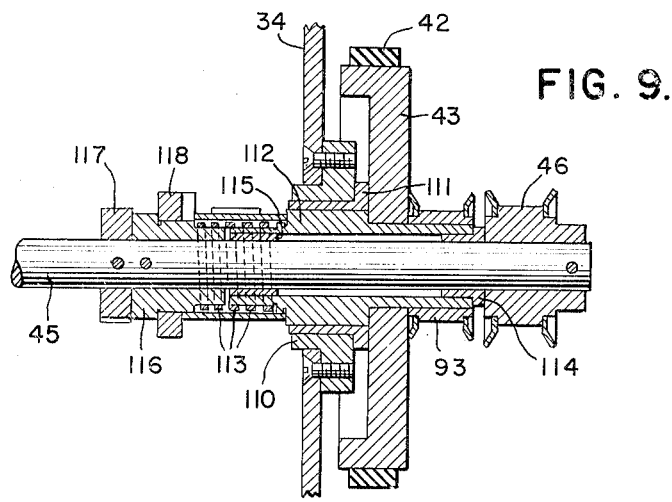

FIG. 9 is a cross sectional view illustrating the internal construction of electromagnetically controlled helical spring wire clutches used in the time clock; and FIGS. 10a–10d, arranged as in FIG. 10, represent the electrical control system of the time clock and the electrical circuit interconnections between the serializer, the several coded time-digit contact sub-assemblies, and the day-of-year switch interconnections by which read out of time and day digits is accomplished.

Figure 1:
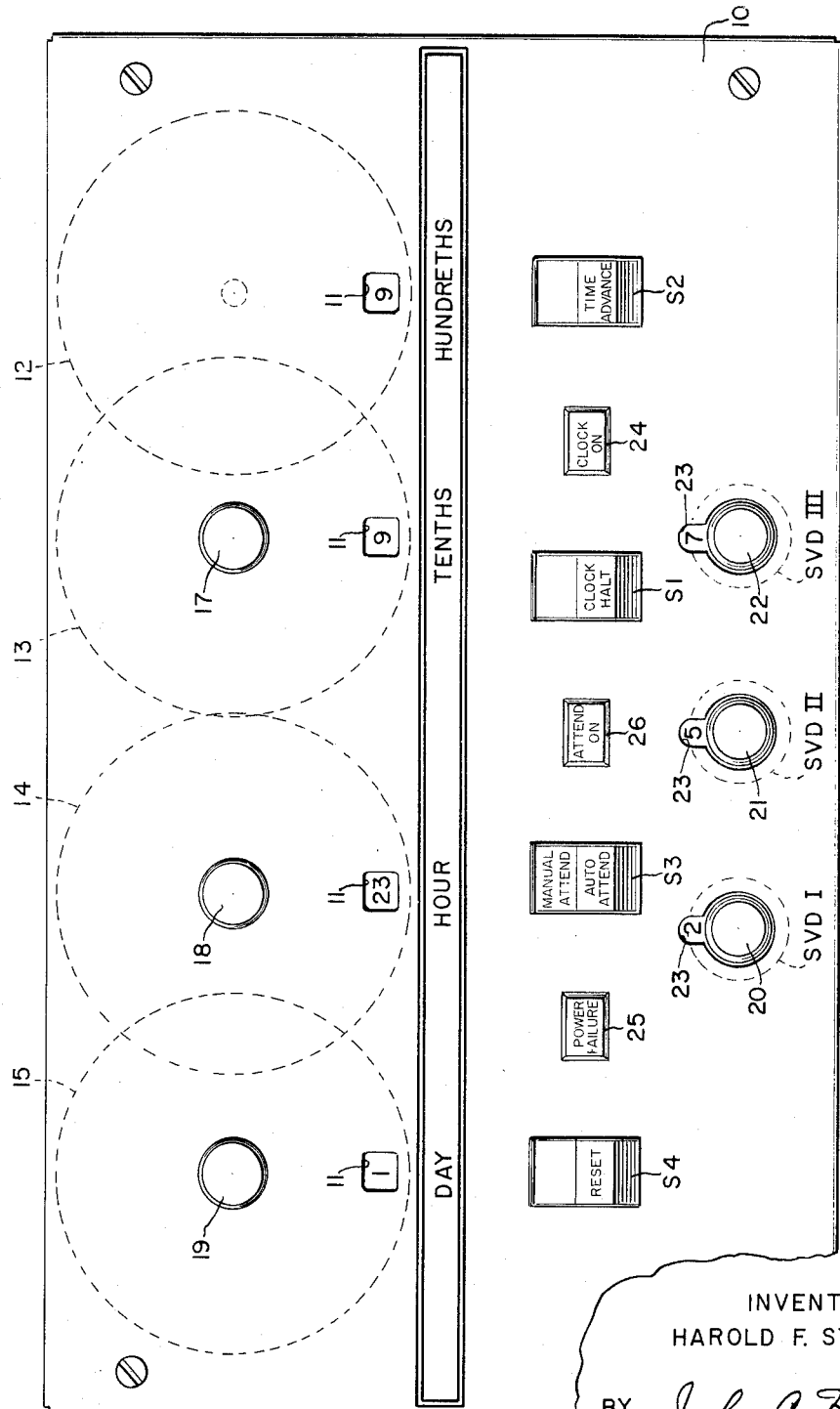
FIG. 1 illustrates the appearance of the front panel of a time clock embodying the present invention.

The time clock herein described has a front panel, illustrated in FIG. 1, having apertures 11 through which may be viewed the time in hundredths of an hour as indicated by the indicia of a hundredths hour dial 12, the tenths of an hour as indicated by the indicia of a tenths hour dial 13, the hour expressed in the Continental form as indicated by the indicia of an hour dial 14, and the day of the week as indicated by the indicia of a day dial 15. The shafts upon which the dials 13–15 are supported have secured thereto forwardly of the panel 10 respective knobs 17, 18 and 19, which may be manually grasped to set the clock to a prescribed time in a manner described hereinafter. As will presently be described more completely, the clock includes triple-deck rotary switches SVDI, SVDII and SVDIII having respective knobs 20, 21 and 22 which may be manually grasped to set the switches to positions corresponding to a particular three-digit day of the calendar year as indicated by dials on the switch shafts having indicia which may be viewed through windows 23 of the front panel. Also accessible through the front panel for manual operation is a clock halt switch S–1, a time advance switch S–2, a manual attendance or auto attendance control system switch S–3, and a reset switch S–4. An indicator window 24 becomes illuminated when the clock is energized and operating in normal manner, a window 25 is illuminated should the clock halt by reason of alternating current power failure, and a window 26 becomes illuminated when the clock is used as a component of a larger electrical data translating system which makes use of the attendance switch S–3.

Figure 2:
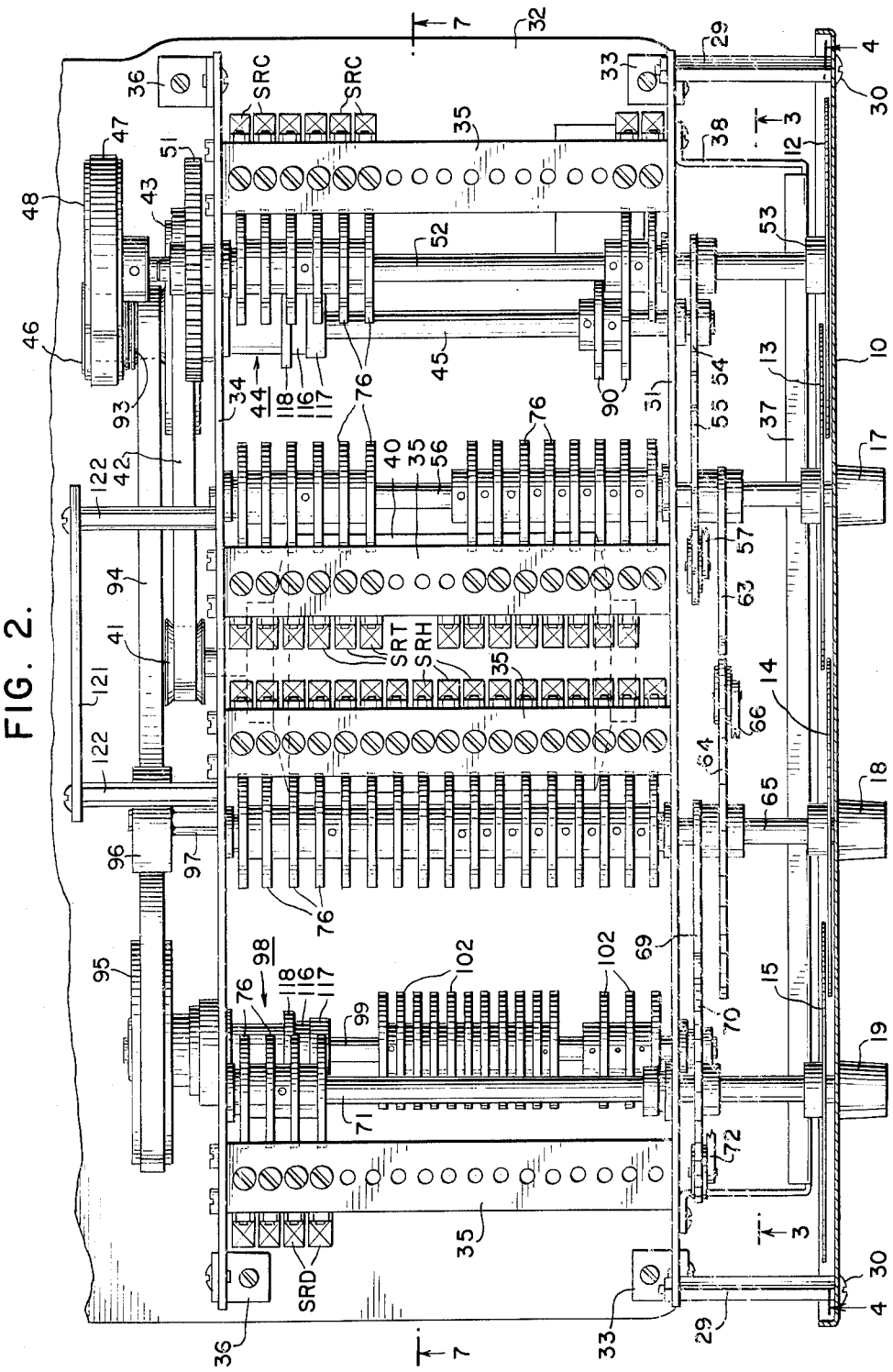
FIG. 2 illustrates a top plan view, FIG. 3 a rear elevational view, and FIG. 4 a side elevational view of the time clock of the invention.

As more clearly shown in FIG. 2, the front panel 10 is separated by spacing bushings 29 and securing bolts 30 to a front plate 31 secured to a base plate 32 by angle brackets 33. A rear plate 34 is secured by plural spacing bars 35 to the front plate 31 and is fastened by angle brackets 36 to the base plate 32. The several switches and indicator lights mentioned in connection with FIG. 1 are supported upon an elongated sub-panel 37 having end brackets 38 with turned over feet by which the sub-panel is secured to the front plate 31 by machine screws as shown.

Figure 3:
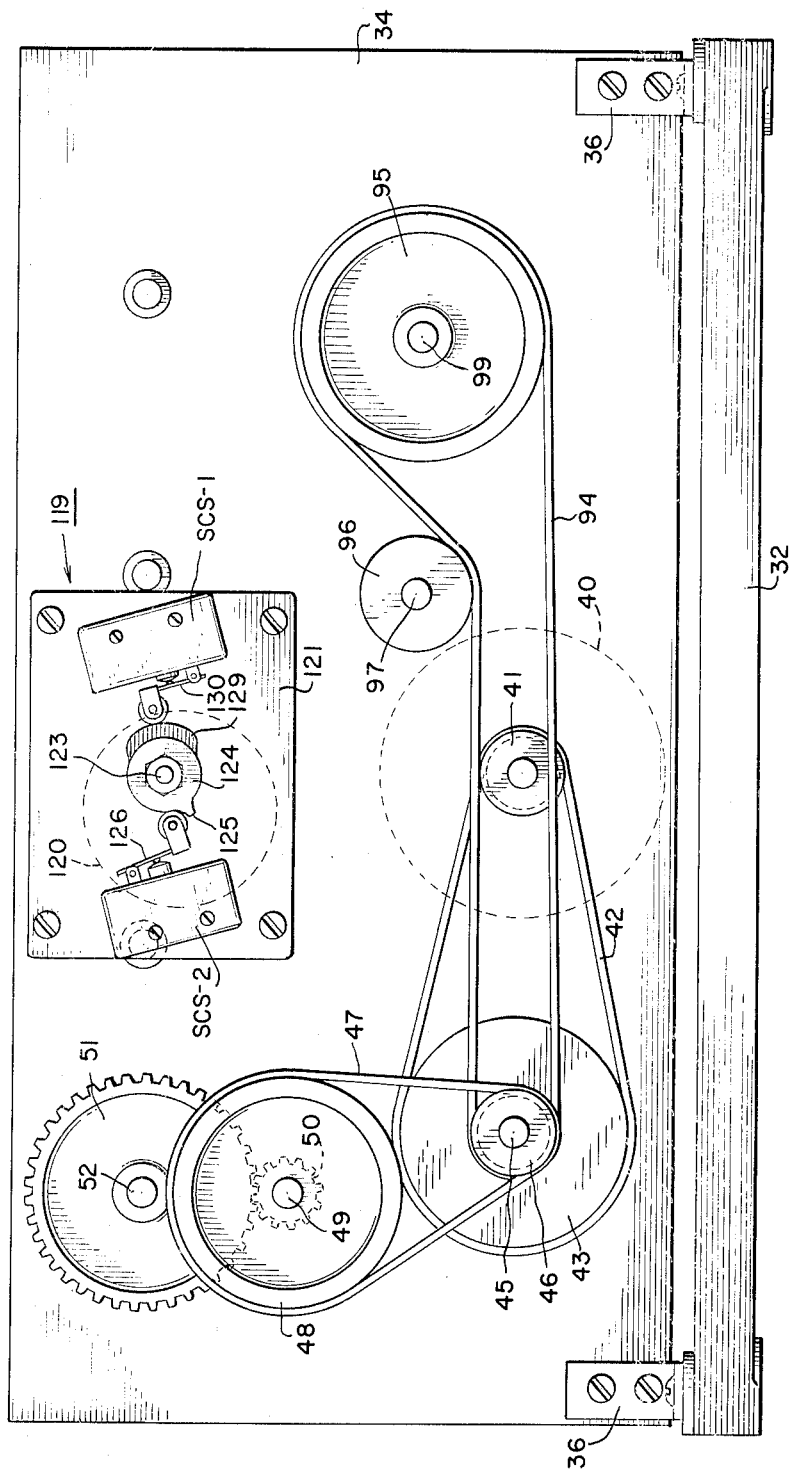
Figure 4:
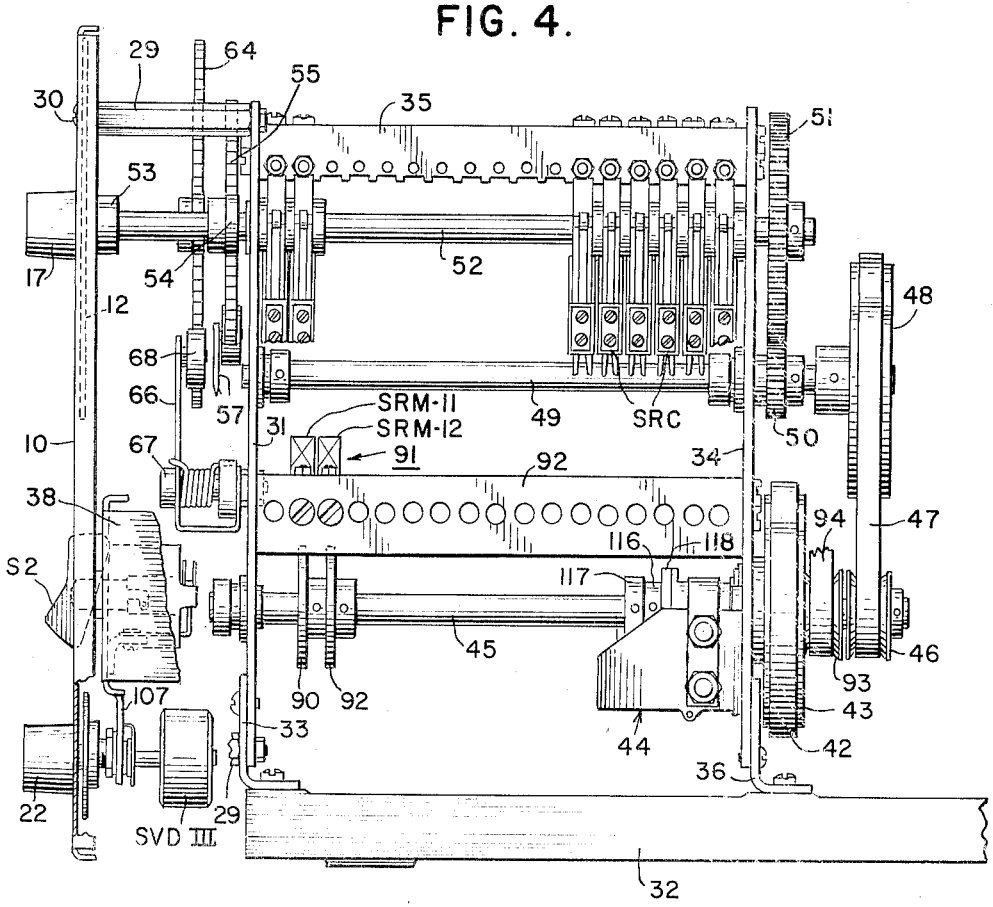

The clock is mechanically driven by an alternating current synchronous motor 40 centrally mounted on the base plate 32 and having a pulley 41 which is connected by a belt 42 to a speed reduction pulley 43 fixedly secured upon a projecting sleeve of a 360-degree electromagnetically controlled helical spring wire clutch 44 described more fully hereinafter. The clutch 44 is supported in an aperture of the back plate 34 and journals one end of a driven shaft 45, the forward end of the shaft 45 being journalled in the front plate 31. Secured on the rear end of the shaft 45 is a pulley 46 which, as shown more clearly in FIGS. 3 and 4, is connected by a belt 47 to a speed reduction idler pulley 48 affixed to the rear end of a shaft 49 journalled by the front plate 31 and rear plate 34. While not shown in the interests of simplicity, the belts 42 and 47 have conventional integral transverse spaced bars formed on their inner surfaces and the belt engaged peripheral surfaces of the pulleys 41, 43 and 46, 48 are provided with conventional transverse cooperating grooves for positive pulley drive. A pinion gear 50 is secured on the shaft 49 in meshed engagement with a speed reduction gear 51 secured on the rear end of a shaft 52 journalled in the front plate 31 and rear plate 34. The hundredths hour indicia dial 12 is secured on the front end of the shaft 52 by means of a bushing 53, FIG. 4, formed integrally with the dial 12.

Secured to the shaft 52 just forwardly of the front plate 31 is a one-tooth gear segment 54, shown more clearly in FIG. 5. Each complete revolution of the shaft 52 causes the gear segment 54 to engage and drive a full gear 55 mounted upon a shaft 56 journalled in the front plate 31 and rear plate 34. The tenths hour indicia dial 13 is secured upon the forward end of the shaft 56, but positioned just rearwardly of the dial 12, as illustrated in FIG. 6, and the front end of the shaft 56 terminates in the manually adjustable knob 17. A detent arm 57 is pivotally supported on a stud 58 of the front plate 31 and is biased by a spring 59 to engage a detent roller 60 pivotally supported on the end of the arm 57, with adjacent pairs of teeth of the gear 55. This detent structure retains the gear stationary after each rotational drive of the gear by the gear segment 54 or after manual setting of the shaft 56 by manipulation of the knob 17.

A one-tooth segmental gear 63 is similarly secured to the shaft 56, forwardly of the gear 55, and each complete rotation of the shaft 56 causes this segmental gear to engage and drive a full gear 64 secured upon a shaft 65 journalled in the front plate 31 and rear plate 34. The shaft 65 carries at its forward end the hour dial 14 and is terminated at its forward end by the knob 18. A spring biased detent structure having an arm 66, pivotally supported by a stud 67 on the front plate 31 and carrying a pivotally supported detent roller 68, engages the teeth of the gear 64 to maintain this gear in the angular position to which it is moved each time by the segmental gear 63 or to which it is adjusted by manual manipulation of the knob 18.

A one-tooth segmental gear 69 is secured to the shaft 65 rearwardly of the gear 64, and upon each revolution of the shaft 65 drivingly engages a gear 70 secured to a shaft 71 journalled in the front plate 31 and rear plate 34. The front end of the shaft 71 carries the day dial 15 and terminates in the knob 19. A spring biased pivoted detent arm 72 has a pivotally supported roller 73 which engages the teeth of the gear 70 to maintain the gear stationary after each partial rotation by the segmental gear 69 or after angular adjustment of the shaft 71 manually by manipulation of the knob 19.

Considering now the operation of the time clock as thus far described, the electromagnet of the clutch 44 is briefly energized once each 36-second interval. The manner in which this energization is accomplished will presently be considered more fully, and it will merely be stated at this time that the energization of the clutch is sufficiently brief that the clutch mechanically couples the pulley 43 to the shaft 45 for one complete revolution of the latter. This revolution of the shaft 45 rotates the shaft 52 through thirty-six angular degrees by reason of the mechanical coupling of these shafts through the step down pulleys 46 and 48 and the step down gears 50 and 51. Assume that the shaft 52 begins its initial rotation from an angular position at which the associated dial 12 displays the numeral "0" through the window 11 of the front panel 10. Successive brief energizations of the electromagnet of the clutch 44 effect successive motor driven angular rotational steps of the shaft 52, and during the tenth such step the segmental gear 54 engages and moves the gear 55 by one tooth pitch or thirty-six angular degrees. This drive of the gear 55 is imparted to the shaft 56 as a 36-degree angular rotation of the latter, so that ten angular steps of the dial 12 to indicate the passage of ten successive hundredths hour of time effects motion of the dial 13 to indicate passage of one-tenth hour of time.

In similar manner, during the tenth angular step of the shaft 56 the segmental gear 63 engages and moves the gear 64 by one tooth pitch to rotate the shaft 65 through one twenty-fourth of a revolution (15 degrees) and effect indication by the dial 14 of the passage of one hour of time. It will be noted from FIG. 6 that the hour dial 14 indicates time in the Continental system of 24 hours per day. During the 24th successive angular step of the shaft 65, the segmental gear 69 engages and moves the gear 70 by one tooth pitch which corresponds to slightly more than 17.4 degrees corresponding to the thrice repeated day of the week indicia provided on the day dial 15.

Thus it will be evident that succeeding brief energizations of the clutch 44 result in the registration and indication by the clock of the passage of time in days of the week, and hours of the day to two significant decimal points.

As illustrated in FIG. 2 of the drawings, each of the shafts 52, 56, 65 and 71 has secured thereto a plurality of cams 76 which actuate individual contact subassemblies 74 supported upon the spacer bars 35 as illustrated more clearly in FIG. 7. These contact subassemblies have similar constructions and include a base member 77 having a projection 78 of square cross-section which is received within a longitudinal groove 79 of the spacer bar 35. The spacer bars 35 are also grooved transversely, as illustrated in FIG. 4 to receive and accurately align the end of the base member 77 transversely of the spacer bar 35 after lateral spacing adjustment of the base member by an adjusting screw 80. A machine screw 81, extending through an aperture of elliptical cross-section provided in the spacer bar 35, secures the base member 77 in laterally adjusted position on the bar 35. The contact subassembly 74 includes a pivoted roller 81 which is supported on the end of a cam-follower arm 82, pivoted at 83 on an extension 84 of the base member 77 in aligned engagement with an individual one of the cams 76. The roller 81 is biased into engagement with the associated cam 76 by a leaf spring 85. The latter in addition actuates a pin 86, reciprocally supported in an aperture of the base member 77, to actuate the movable contact of a contact assembly SRC.

It is the purpose of these contact subassemblies 74 and their associated cams 76 to generate electrically coded signals indicative of the prevailing time as indicated by the prevailing angular positions of the shafts 52, 56, 65, and 71 of the clock. While any suitable code form may be used for this purpose, such as a binary-decimal code form, Table A of the drawings tabulates one form of code by which each time numeric digit of value zero through nine may be represented by a total of six code bits.

Accordingly the shaft 52 is provided at its rear end with six cams 76, each having one or more cam lobes 88 (FIG. 7), which actuate their associated contact subassemblies 74 to transmit according to the code of Table A the prevailing value of the hundredths time digit represented by the prevailing angular position of the shaft 52 and its hundredths dial 12. Similarly, the shaft 56 is provided at its rear end with six cams 76 which actuate associated ones of six contact subassemblies 74 and the contacts SRT thereof to transmit the prevailing tenths of hour setting of the time clock. For use of the time clock as an element of a larger data translating system, the shaft 56 is additionally provided on its forward end with eight further cams 76 which with their associated contact subassemblies are used in an automatic attendance mode of the data system. The hour shaft 65 is provided with six rearmost cams 76 which cooperate with associated contact subassemblies 74 to actuate contacts SRH thereof and transmit the prevailing units digit of the hour to which the shaft 65 is set at any time. Three additional cams 76 of intermediate location on the shaft 65 cooperate with associated contact subassemblies to transmit the tens digit (the numeral "0," the numeral "1" or the numeral "2") of the hour to which the shaft 65 is set. Eight cams 76 positioned on the forward end of the shaft 65 cooperate with associated contact subassemblies for use in the automatic attendance mode of system operation just previously mentioned. Since there are only seven days of the week, these seven numeric data digits may be transmitted according to the code of Table A by use of only four code bits. These are generated by four cams 76 provided at the rear end of the shaft 71 and which operate associated individual contact subassemblies 74 to actuate day contacts SRD thereof.

It was previously explained that the electromagnetic of the clutch 44 is briefly energized to effect one complete revolution of the shaft 45 in response to each period of energization of the clutch. This limitation on the period of electrical energization of the clutch 44 is accomplished by a relay control system hereinafter described and which makes use of a cam 90 (FIGS. 2, 4 and 7) secured to the shaft 45 and cooperating with a contact subassembly 91 having the same construction as the contact subassemblies 74 earlier described and supported upon a spacer bar 92 extending between the front plate 31 and the rear plate 34 of the clock. The contacts of this subassembly are identified as SRM-11. For use of the time clock as a component of a larger data translating system, a further cam 92 is also fixedly supported on the shaft 45 to operate a contact subassembly SRM-12.

The prevailing setting of the time clock in terms of the numeric day of the week and the numeric hour, to two significant decimal places, may be transmitted to a recorder by concurrent energization of all of the electrical contacts SRC, SRT, SRH and SRD whereby all of the time coded digits are transmitted concurrently and with parallel presented digit code bits. This requires a separate transmission circuit for each possible code bit of each possible digit. For many applications, however, the time digits may be transmitted in succession according to a preselected digit order and this form of transmission is employed by way of example in the present time clock. To this end, a so-called serializer is included in the time clock. It is the purpose of the serializer to energize in order the contact subassemblies representative of the day of the week clock setting, the tens digit followed by the units digit of the hour of day clock setting, the tenths of hour clock setting and the hundredths of hour clock setting.

Figure 8:
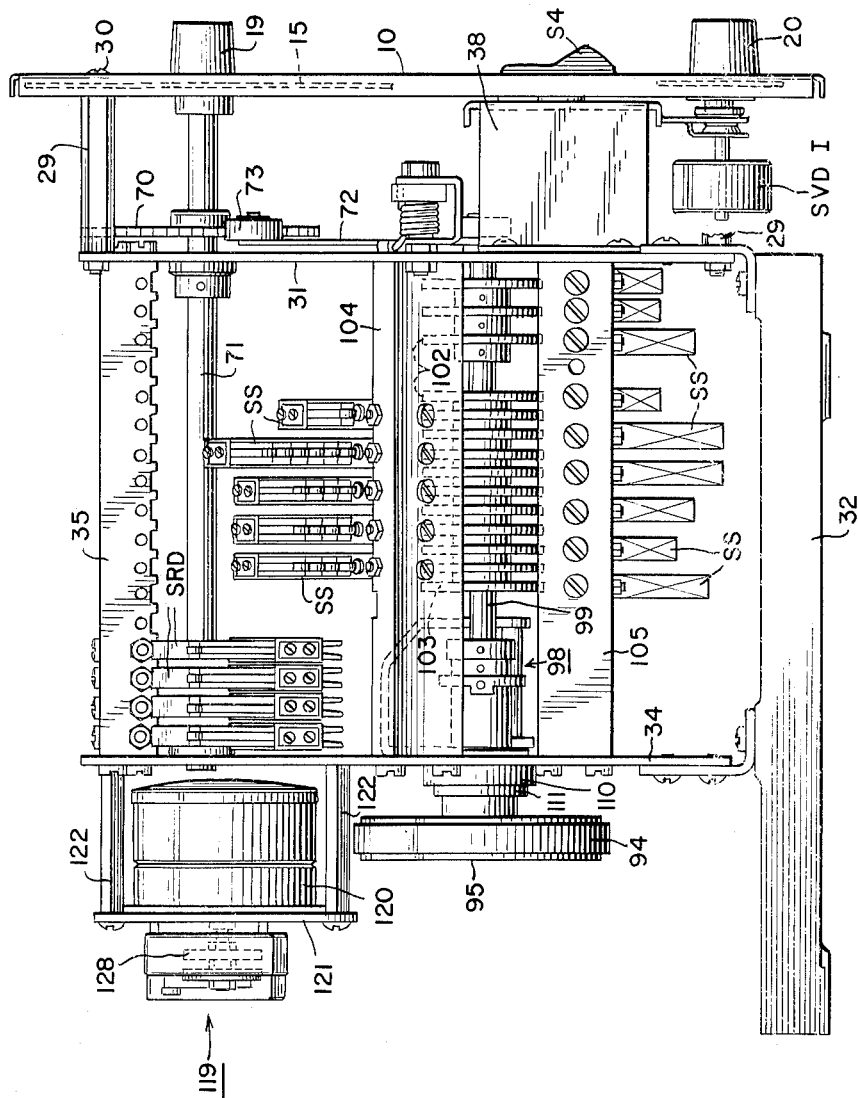
FIG. 8 is a further end elevational view illustrating more clearly the arrangement of serializer cams and cam-actuated sub-assemblies used in accomplishing coded time-digit read-out of the time clock.

The serializer just mentioned has a construction illustrated more clearly in FIGS. 2, 3 and 8, and is driven from the synchronous motor 40 through the belt 42 and pulley 43 and through a pulley 93 fixedly rotating with the pulley 43 and a belt 94 to a pulley 95. The belt 94 is of the transverse ribbed type earlier described with reference to the belts 42 and 47, and the peripheral surfaces of the pulleys 93 and 95 are provided with cooperating grooves for positive pulley drive. An idler roll 96, rotatably supported on a stud 97 of the back plate 34, maintains the belt 94 tensioned. An electromagnetically controlled helical spring wire clutch 98 is supported on the back plate 34 and has an inner sleeve extending through the back plate to support the pulley 95. The construction of the clutch 98 will presently be described more fully, and energization of the clutch serves mechanically to couple the pulley 95 to a driven shaft 99. The front end of the shaft 99 is journalled in the front plate 31 and its rear end is journalled in the clutch 98. Fixedly secured to the shaft 99 and spaced along its length are a plurality of cams 102 totaling 14 in number and cooperating with individual ones of a plurality of electrical contact subassemblies 103 (FIGS. 7 and 8) supported in groups upon a pair of spacer bars 104 and 105 extending between the front plate 31 and the rear plate 34. The contact subassemblies 103 have the same general construction as the subassemblies 74 earlier described, except that the subassemblies 103 include stacks of plural contact pairs as shown. Five of these contact subassemblies are actuated successively by their associated cams 102, and each of these energizes an individual group of the subassembly contacts SRC, SRT, SRH and SRD to effect successive read-out of the coded digits of the latter subassemblies. Others of the serializer contact subassemblies perform control functions in a more complete data translation system of which the present time clock may be a component, and three of the serializer contact subassemblies energize successively (and in successive relation to energization of the subassembly contacts SRC, SRT, SRH, and SRD) and three day-of-the-year switch decks operated by the manual knobs 20–22 described in connection with FIG. 1. These switch decks, as illustrated schematically for switch unit SVDIII of FIG. 4, are mounted upon a depending extension 107 of the sub-chassis 37 earlier described. The electrical interconnections of the switch decks will be shown and described more fully hereinafter in connection with the electrical control system of the time clock.

The electromagnetically controlled clutches 44 and 98 are of the 360° type and have constructions more fully disclosed and described in the Blodgett U.S. Patent No. 2,927,158, but modified slightly internally as shown by the cross-sectional view of FIG. 9. The construction illustrated in FIG. 9 is particularly applicable to the clutch 44, but except for the outermost pulley 46 is also fully applicable to the clutch 98. It includes a mounting flange 110 secured by machine screws as shown in an aperture of the back panel 34 and having a bearing 111 in which is journalled a clutch element 112. The conventional helical spring wire clutch element 113 surrounds the forward end of the clutch element 112, and there is fixedly secured to the rear end of the element 112 the pulleys 43 and 93. Both ends of the clutch element 112 also support internal bearings 114 and 115 which journal the rear end of the driven shaft 45. There is affixed to the shaft 45 a second clutch element 116, having its rear end surrounded by the helical wire spring 113, and a detent member 117 which cooperates in conventional manner with a keeper (not shown) provided in the clutch. The conventional knock off cam 118 is journalled for limited rotational movement on the clutch element 116.

Electrical control pulse energizations of the electromagnet of the clutch 44 are generated by an alternating current energized synchronous motor unit 119 shown in FIGS. 3 and 8. This unit includes a synchronous motor 120 mounted upon a base plate 121 supported by spacer members 122 from the back plate 34. The motor 120 includes, internally of the motor housing, a gear reduction train which couples the motor shaft to an output shaft 123 making one complete rotation each 36 second interval. The shaft 123 has fixedly supported thereon a first cam 124 having a lobe 125 which through a cam follower arm 126 effects closure of the contacts of a microswitch SCS–2 for three seconds during each rotation of the shaft 123. The latter also has affixed thereto a cam 128 (FIG. 8) having a lobe 129 (FIG. 3) which through a cam follower arm 130 operates pairs of contacts of a microswitch SCS–1 to closed-circuit and open-circuit positions for thirteen seconds during each rotation of the shaft 123. The manner in which the microswitches SCS–1 and SCS–2 control periodic energization of the clutch 44 will now be considered with reference to FIG. 10 and particularly FIG. 10d.

The serializer construction disclosed and described herein is disclosed and claimed in the copending application of Edwin O. Blodgett, Serial No. 254,990, filed January 30, 1963 entitled "Electrical Sequential Circuit Controller," and assigned to the same assignee as the present application.

Figure 10A:
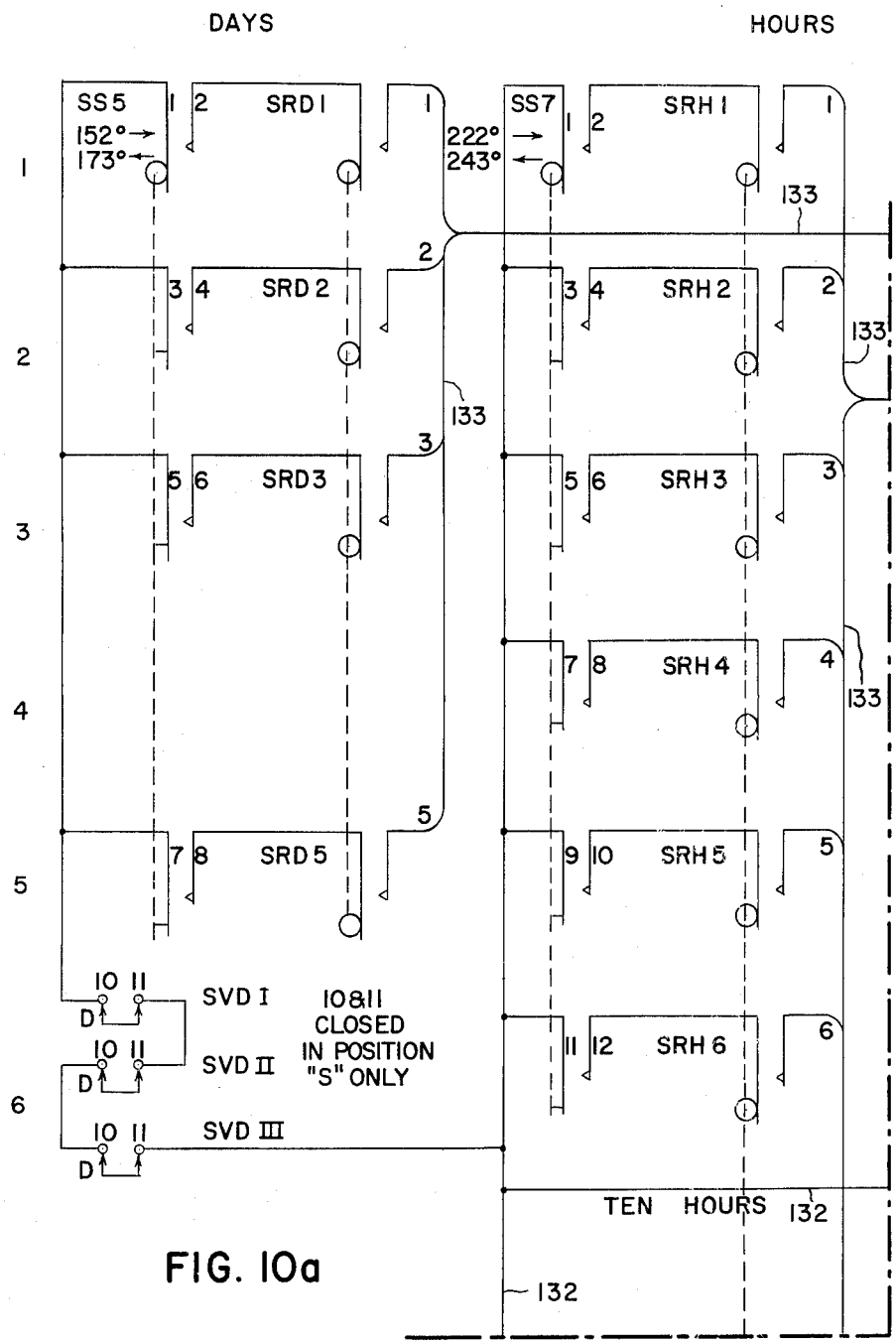
Figure 10A:
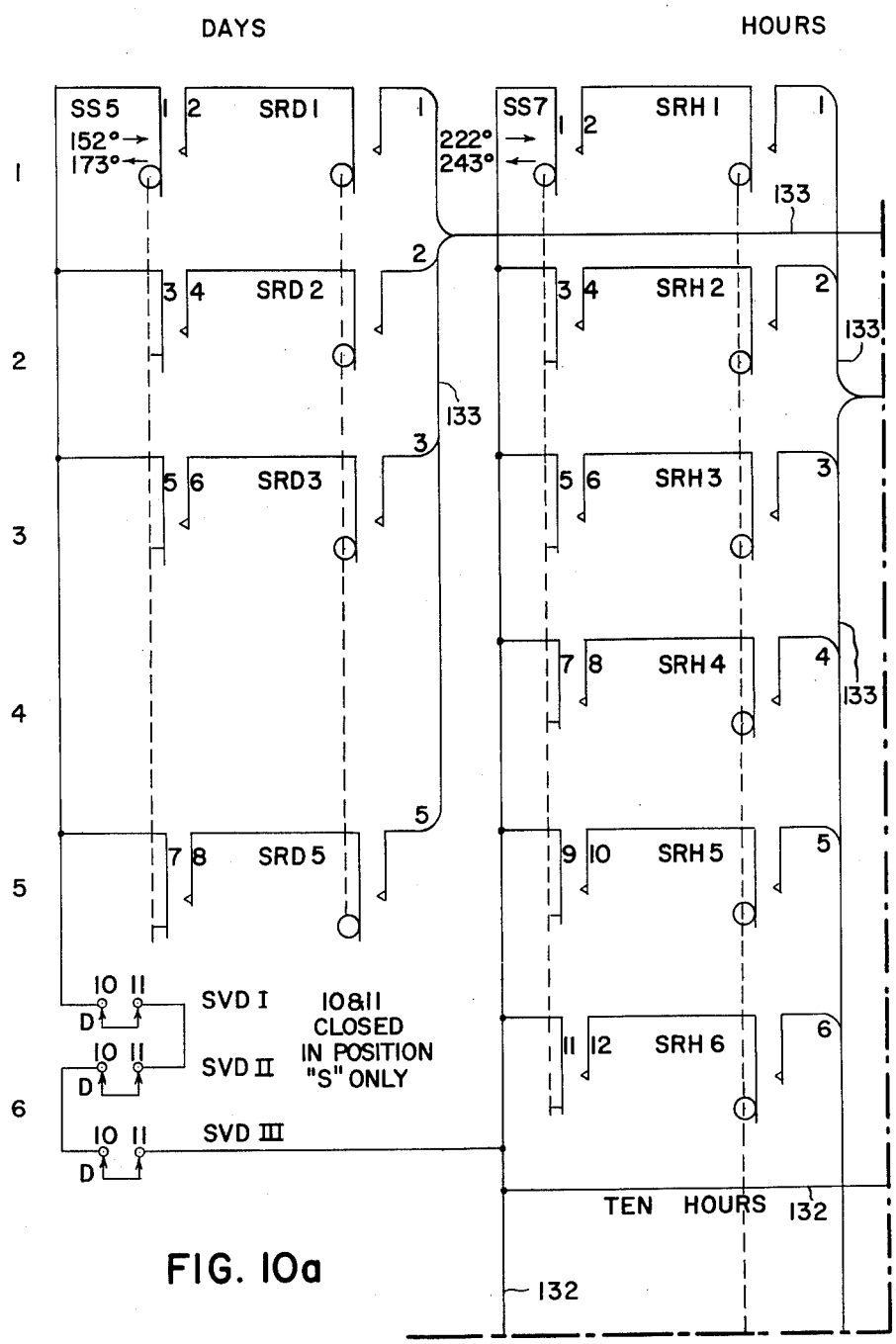
Figure 10B:
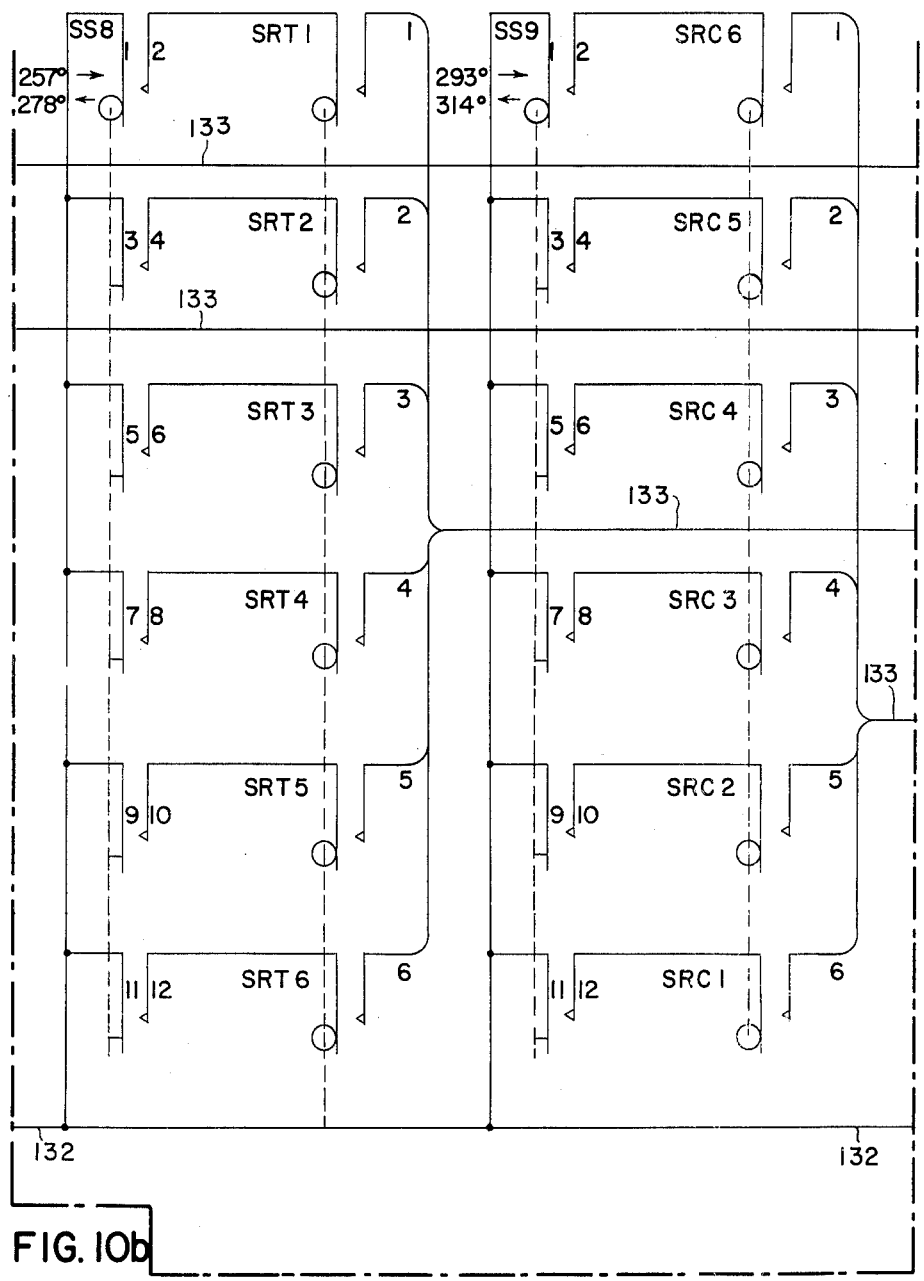
Figure 10C:
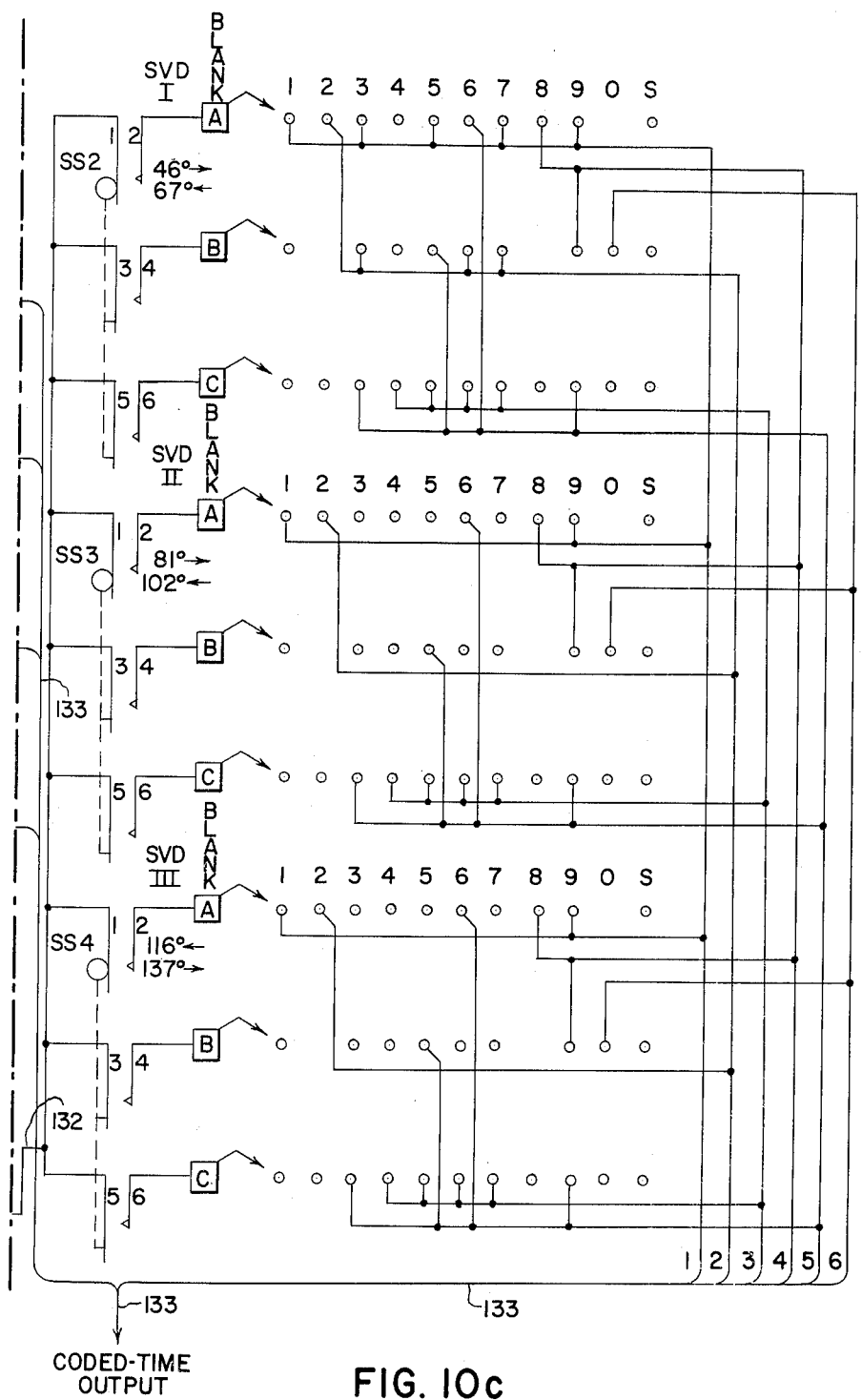

The complete electrical control and read-out circuits of the time clock are shown in FIGS. 10a–10d. Normal operating time advance is effected under control of the synchronous clock motor 122 energized from a suitable source of alternating current through the normally closed contacts 1 and 2 of a clock halt switch S1 (FIG. 10d). The clock motor 122 continuously operates the cam actuated contacts SCS–1 and SCS–2, the timing of these contacts being such that the contacts SCS–1 close one second before transfer of the contacts SCS–2 and are closed for 13 seconds during each 36-second interval. The contacts SCS–2 transfer for three seconds during each 36-second interval. Normal successive time advances of the clock are effected by energization of the electromagnet TAC of the time advance clutch 44 through the normally closed contacts 1 and 2 of a relay KARC, the normally closed contacts 4 and 5 of a relay KHLT, and the contacts 3 and 4 of the cam actuated contacts SCS–2 when these contacts normally close for three seconds. Energization of the time advance clutch electromagnet TAC causes the clutch 44 mechanically to drive the clock drive shaft 45 from the drive motor 40 in the manner earlier explained, and at 65 degrees of rotation of the shaft 45 the cam actuated contacts SRM–11 close to energize the relay KARC from the clutch energizing circuit last traced. The contacts 1 and 2 of the relay KARC now open to interrupt the energization of the time advance clutch electromagnet TAC, and contacts 2 and 3 of the relay KARC now close to establish a hold circuit for this relay through the normally closed contacts 4 and 5 of the relay KHLT, the now closed cam actuated contacts SCS–1, and the now closed contacts 24 and 25 of the relay KARC. Energization of the relay KARC, by the de-energization of its contacts 1 and 2 of the time advance clutch electromagnet TAC, limits the time advance to one revolution of the clock drive shaft 45. The hold circuit last described for the relay KARC remains energized for a total of 12 seconds through the now closed cam-actuated contacts SCS–1. Upon opening of the latter contacts, the hold circuit of the relay KARC is interrupted so that its hold-circuit contacts 24 and 25 open while its contacts 1 and 2 again close in readiness for a further time advance upon the next transfer of the cam actuated contacts SCS–2.

Whenever for any reason it is desired to set the time clock to a time standard, the clock halt switch S1 is manually operated to energize a halt relay KHLT. The normally closed contacts 1 and 2 of the halt switch S1 open to remove a shunt from the normally closed contacts 1 and 2 of the cam actuated contacts SCS–2 so that the clock motor 122 becomes de-energized upon the next transfer of the cam actuated contacts SCS–2. The contacts 3 and 4 of the cam actuated contacts SCS–2 now close to establish a hold circuit for the halt relay KHLT through its transfer contacts 5 and 6 and a diode rectifier device CR1. Since the clock motor 122 has been halted with the contacts 3 and 4 of the cam actuated contacts SCS–2 closed, manual operation of the time advance switch S2 to close its contacts effects energization of the time advance clutch electromagnet TAC through the normally closed contacts 1 and 2 of the relay KARC. The relay KARC, as before, is energized by the cam actuated contacts SRM–11 at 65 degrees of the clock drive shaft 45 and holds through its now transferred contacts 2 and 3 so long as the switch S2 remains with its contacts manually closed. As previously explained, operation of the relay KARC limits energization of the time advance clutch electromagnet TAC to one clock drive shaft revolution. By repeated manual actuation of the time advance switch S2, the setting of the hundredths digit of the time clock to a desired value is accomplished. Tenths of hour, hour, and day settings are then accomplished by the manual setting knobs provided. When the time of the reference time standard advances to that thus manually set into the time clock, the clock halt switch S1 is manually operated to close its contacts 1 and 2 and to open its contacts 4 and 5. This reenergizes, through the now closed contacts 1 and 2 of the switch S1, the clock motor 122. Upon the next transfer of the cam actuated contacts SCS–2, the halt relay KHLT is de-energized by interruption of its hold circuit at the contacts 3 and 4 of the cam actuated contacts SCS–2, thus preventing an immediate undesired time advance by energization of the time advance clutch electromagnet TAC while the cam actuated contacts SCS–2 remain in the transferred state upon re-energization of the clock motor 122.

FIGS. 10a–10d show the electrical circuit interconnections between the serializer contact subassemblies and the time clock coded-digit contact subassemblies by which the prevailing time registered by the time clock is transmitted for recording or other use desired. Referring particularly to FIG. 10d, positive potential is applied to the movable contact of each contact pair of the serializer cam-actuated contact assemblies through an electrical circuit 132 energized through serializer cam actuated contacts SS11 (FIG. 10d) from a suitable source of positive unidirectional potential. As will be seen from the table associated with serializer cam actuated contacts SS11 and expressing the angular position of the serializer shaft 97 at which the contacts SS11 open and close, these serializer contacts are closed for a short time interval concurrently with the closing (during a longer time interval) of all others of the serializer cam actuated contacts SS2–SS9 shown in FIGS. 10a–10d.

The positive potential thus applied to the particular serializer cam actuated contacts SS2 (FIG. 10c) is applied through its contact pairs 1–2, 3–4 and 5–6 to the movable contacts S, B and C (manually set concurrently by the manual knob 20 of FIG. 1 to a "blank" position or to any of numeric day-of-the-year digit values 0–9 or to a "space" position S) of the three wafer switch decks of the switch SVDI. The contacts of these switches are electrically interconnected as shown so that the energization applied to the movable contacts of the switch decks by the serializer contacts SS2 energize individual and coded combinations of the coded-time output circuit 133 in conformity with Table A and according to the manual setting of the switch SVDI. Thus the serializer cam actuated contacts SS2 cause read out to the coded-time output circuit 133 of a coded digit representing the hundreds digit value of the day of the year manually set into the switches SVDI, SVDII and SVDIII. Following the opening of the serializer contacts SS2 at 67° of the serializer shaft 97, the serializer contacts SS3 close between 81° and 102° of the serializer shaft 97 to read out to the coded-time output circuit 133 the coded value of the tens day-of-the-year digit set into the day switches. Thereafter the serializer contacts SS4 read out the coded digits value of the day of the year.

As shown in FIG. 10a, the day-of-the-year switches SVDI, SVDII and SVDIII each have a bridging contact D which bridges a pair of contacts 10 and 11 of each switch whenever that switch is set to its "space" position S to indicate that no day-of-the-year value has been manually set into the switch. Thus when all of the switches are set to their "space" position S, positive energization from the energizing circuit 132 is supplied through the now closed contacts 10 and 11 of each of the day-of-the-year switches to energize the serializer cam actuated contacts SS5. These contacts when energized effect read out to the coded time output circuit 133 of the prevailing day-of-the-week digit registered in digit-coded form by the day cam-actuated contacts SRD1–SRD3 and SRD5 of the clock. In similar manner, the serializer cam-actuated contacts SS6 (FIG. 10d) read out to the coded-time output circuit 133 the tens digit of the prevailing hours registered by the time clock and the serializer cam-actuated contacts SS7 (FIG. 10a) then read out the units digit of the prevailing hour. Thereafter the serializer cam-actuated contacts SS8 and SS9 (FIG. 10b) successively read out to the coded-time output circuit 133 the coded value of the prevailing tenths hour and hundredths hour digits registered by the time clock.

It will accordingly be seen that the serializer operates upon each energizaiton of the electromagnet of its clutch 98 to effect successive digit read out to the coded-time output circuit 133 of the coded value of the day of the year manually set into the switches SVDI, SVDII and SVDIII, or alternatively the prevailing day of the year registered by the time clock, together with the prevailing hour (to two significant decimal values) registered by the time clock.

It will be apparent from the foregoing description of the invention that a time clock embodying the invention is suitable for use as a master clock for numerous and diverse system applications requiring a reliable time standard for record purposes. The time clock of the invention is of relatively simple yet sturdy construction, and is characterized by unusually high operational reliability over prolonged periods of operation without the need for significant maintenance care or attention. The time clock of the invention is adapted continuously to supply in simple yet reliable manner, and for each time digit of interest, coded multidigit time-indication electrical control signals capable of translating substantial electrical power to effect time recordings either locally or after transmission to a remote point.

While a specific form of invention has been described for purposes of illustration, it is contemplated that numerous changes may be made without departing from the spirit of the invention.

I claim:

1. A time clock comprising a plurality of shafts each rotationally indicative of the value of an individual one of plural prevailing-time digits and positionally spaced with their axes in parallel co-planar relation from lowest to highest digit orders, impulse-actuator driving gear means mechanically coupling each lower-order shaft to the adjacent higher-order shaft to effect time-interval-summation power drive of said adjacent higher-order shaft from said lower-order shaft, drive power means including a continuously rotating output member, timing clutch means for periodically mechanically coupling said output member to said lowest-order shaft for periodic rotational power drive thereof during each of successive uniform intervals bearing an integral proportionality to the maximum value of digit time interval indicated by said lowest-order shaft, and cam-actuated switch-contact means power operated by each of said shafts for enabling generation of a coded electrical signal indicative of the prevailing values of the time digits indicated by all of said shafts.

2. A time clock comprising a plurality of shafts each rotationally indicative of the value of an individual one of plural prevailing-time digits and positionally spaced with their axes in parallel co-planar relation from lowest to highest digit orders, impulse-actuator driving gear means mechanically coupling each lower-order shaft to the adjacent higher-order shaft to effect time-interval-summation power drive of said adjacent higher-order shaft from said lower-order shaft, drive power means including a continuously rotating output member, a helical-wire-spring clutch and means for periodically actuating said clutch mechanically to couple said output member to said lowest-order shaft for periodic rotational power drive thereof during each of successive uniform intervals bearing an integral proportionality to the maximum value of digit time interval indicated by said lowest-order shaft, and cam-actuated electrical contacts having cam elements power operated by each of said shafts to provide code combinational contact actuations for enabling generation of a coded electrical signal indicative of the prevailing values of the time digits indicated by all of said shafts.

3. A time clock comprising a plurality of rotatable shafts each rotationally indicative of the value of an individual one of plural prevailing-time digits and positionally arranged with their axes in parallel co-planar relation from lowest to highest digit orders, drive gearing including a segmental gear member on each lower-order shaft and a cooperating full gear on the adjacent higher-order shaft for mechanically coupling said each lower-order shaft to said adjacent higher-order shaft to effect time-interval-summation power drive of said adjacent shaft from said lower-order shaft, drive power means including a continuously rotating output member, timing-clutch means for periodically mechanically coupling said output member to said lowest-order shaft for periodic rotational power drive thereof during each of successive uniform intervals bearing an integral proportionality to the maximum value of digit time interval indicated by said lowest-order shaft, and means power operated by each of said rotatable shafts for enabling generation of a coded electrical signal indicative of the prevailing values of the time digits indicated by all of said shafts.

4. A time clock comprising a plurality of rotatable shafts each step-rotationally indicative of the value of an individual one of plural prevailing-time digits and positionally arranged with their axes in parallel co-planar relation from lowest to highest digit orders, drive gearing including a segmental gear member on each lower-order shaft and a cooperating full gear on the adjacent higher-order shaft for mechanically coupling said each lower-order shaft to said adjacent higher-order shaft to effect time-interval-summation intermittent step-motion power drive of said adjacent shaft from said lower-order shaft, a detent mechanism individual to each said full gear and engaging the teeth thereof for retaining the associated rotatable shaft stationary during intervals between successive step motions thereof, drive power means including a continuously rotating output member, timing-clutch means for periodically mechanically coupling said output member to said lowest-order shaft for periodic rotational power drive thereof during each of successive uniform intervals bearing an integral proportionality to the maximum value of digit time interval indicated by said lowest-order shaft, and means power driven by each of said rotatable shafts for enabling generation of a coded electrical signal indicative of the prevailing values of the time digits indicated by all of said shafts.

5. A time clock comprising a plurality of indicating means each step rotationally indicative of the value of an individual one of plural prevailing-time digits and positionally arranged from lowest to highest digit orders, impulse-actuator driving means mechanically coupling each lower-order indicating means to the adjacent higher-order indicating means to effect time-interval-summation intermittent step-motion power drive of said adjacent indicating means from said lower-order indicating means, drive power means including a continuously rotating output member, timing-clutch means for periodically mechanically coupling said output member to said lowest-order indicating means for periodic rotational step power drive thereof during each of successive uniform intervals bearing an integral proportionality to the maximum value of digit time interval indicated by said lowest-order indicating means, and means including plural cams operated by each of said indicating means and plural electrical contacts operated singly and in coded combinations by said cams for enabling generation of a coded electrical signal indicative of the prevailing values of the time digits indicated by all of said indicating means.

6. A time clock comprising a plurality of rotatable elements each step-rotationally indicative of the value of an individual one of plural prevailing-time digits and positionally arranged from lowest to highest digit orders, impulse-actuator drive gearing including a segmental gear member on each lower-order element and a cooperating full gear on the adjacent higher-order element for mechanically coupling said each lower-order element to the adjacent higher-order element to effect time-interval-summaiton intermittent-step-motion power drive of said adjacent element from said lower-order element, drive power means including a continuously rotating output member, timing-clutch means for periodically mechanically coupling said output member to said lowest-order element for periodic rotational step power drive thereof during each of successive uniform intervals bearing an integral proportionality to the maximum value of digit time interval indicated by said lowest-order element, and a plurality of cams operated by each of said rotatable elements and cooperating cam-follower-actuated contacts operated singly and in coded combinations by code lobes on said cams for enabling generation of a coded electrical signal indicative of the prevailing values of the time digits indicated by all of said elements.

7. A time clock comprising a plurality of rotatable elements each step-rotationally indicative of the value of an individual one of plural prevailing-time digits and positionally arranged from lowest to highest digit orders, impulse-actuator means for mechanically coupling said each lower-order element to the adjacent higher-order element to effect time-interval-summation intermittent-step-motion power drive of said adjacent element from said lower-order element, a drive motor including a continously rotating output shaft, a helical-spring-wire clutch mechanically coupling said output shaft through intermediate step-down drive mechanism to said lowest-order element, timing means for periodically actuating said clutch to effect periodic rotational step drive of said lowest-order element during each of successive uniform intervals bearing an integral proportionality to the maximum value of digit time interval indicated by said lowest-order element, and cam-actuated electrical contact means individual to and power operated by each of said elements for enabling generation of a coded electrical signal indicative of the prevailing values of the time digits indicated by all of said elements.

8. A time clock comprising a plurality of rotatable shafts each step-rotationally indicative of the value of an individual one of plural prevailing-time digits and positionally arranged with their axes in parallel co-planar relation from lowest to highest digit orders providing time indications in hundredths and tenths of an hour, hours of the day, and days of the week; impulse-actuator drive gearing including a segmental gear member on each lower-order shaft and a cooperating full gear on the adjacent higher-order shaft for mechanically coupling said each lower-order shaft to the adjacent higher-order shaft to effect time-interval-summation intermittent-step-motion drive of said adjacent shaft from said lower-order shaft; a drive motor including a continuously rotating output member, a helical-spring-wire clutch mechanically coupling said output member through a step-down intermediate drive mechanism to said lowest-order shaft; timing means for periodically actuating said clutch to effect periodic rotational step drive of said lowest-order shaft during each of successive uniform intervals bearing an integral proportionality to the maximum value of digit time interval indicated by said lowest-order shaft; and a plurality of cams operated by each of said rotatable shafts and cooperating cam-follower-actuated contacts operated singly and in coded combinations by code lobes on said cams for enabling generation of a coded electrical signal indicative of the prevailing values of the time digits indicated by all of said shafts.

9. time clock comprising a plurality of shafts rotationally indicative of the values of individual ones of plural prevailing-time digits and rotationally supported in parallel relation at spaced positions of lowest to highest digit orders, a segmental gear on each lower-order shaft engageable with a full gear on the adjacent higher-order shaft to effect mechanical drive of said shafts in order from the shaft of lowest digit value to the shaft of higest digit value and at an integral inter-shaft drive ratio corresponding to the ratio of the time intervals indicated by a complete revolution of adjacent pairs of said shafts, drive power means including a continuously rotating output member, means including timing means for mechanically coupling said output member to and de-coupling said output member from said lowest order shaft at a uniform periodicity to effect stepped angular drive thereof at uniform intervals bearing an integral ratio to the digit time interval indicated by a complete revolution of said lowest-order shaft, and means controlled by said shafts for indicating electrically the time-digit values established by the prevailing rotational positionings of all of said shafts.

10. A time clock comprising a plurality of shafts step-rotationally indicative of individual ones of plural prevailing-time digits and rotationally supported in parallel relation at spaced positions of lowest to highest digit orders, a segmental gear on each lower-order shaft engageable with a detent-controlled full gear on the adjacent higher-order shaft to effect mechanical step power drive of said shafts in order from the shaft of lowest digit value to the shaft of highest digit value and at an integral inter-shaft drive ratio corresponding to the ratio of the time intervals indicated by a complete revolution of adjacent pairs of said shafts, a drive motor including an output member which rotates continuously at a constant speed, speed reduction means including clutch means for mechanically coupling said output member to and de-coupling said output member from said lowest-order shaft, timing means for actuating said clutch means at a uniform periodicity to effect partial-revolution stepped angular power drive of said lowest-order shaft at uniform intervals bearing an integral ratio to the digit time interval indicated by a complete revolution of said lowest-order shaft, and means controlled by said shafts for indicating electrically the time digit values established by the prevailing rotational positionings of all of said shafts.

References Cited by the Examiner

UNITED STATES PATENTS

| | | | |
|---|---|---|---|
| 608,428 | 8/98 | Moseley | 235—140 |
| 778,447 | 12/04 | Cleveland | 235—140 |
| 1,873,531 | 8/32 | Bixby | 74—125.5 |
| 2,351,814 | 6/44 | Holzner | 58—125 |
| 3,079,045 | 2/63 | Kimball et al. | 235—94 |
| 3,098,398 | 7/63 | Ryan | 74—321 |

OTHER REFERENCES

"Time Generator Gives Direct Readout," Electronics, March 1956, pages 179–181.

LEO SMILOW, *Primary Examiner.*

JOSEPH P. STRIZAK, *Examiner.*

UNITED STATES PATENT OFFICE
CERTIFICATE OF CORRECTION

Patent No. 3,205,651  
September 14, 1965

Harold F. Stiffler

It is hereby certified that error appears in the above numbered patent requiring correction and that the said Letters Patent should read as corrected below.

Column 6, line 19, for "and", second occurrence, read -- the --; column 11, line 5, for "summaiton" read -- summation --; column 12, line 4, for "9. time" read -- 9. A time --.

Signed and sealed this 24th day of May 1966.

(SEAL)  
Attest:

ERNEST W. SWIDER  
Attesting Officer

EDWARD J. BRENNER  
Commissioner of Patents